United States Patent [19]
LaRiviere et al.

[11] Patent Number: 5,737,193
[45] Date of Patent: Apr. 7, 1998

[54] ELETRICAL CHASSIS STORAGE CABINET

[75] Inventors: Phillip H. LaRiviere, Woonsocket, R.I.; Richard Albert Nelson, Chanhassen, Minn.

[73] Assignee: EMC Corporation, Hopkinton, Mass.

[21] Appl. No.: 505,405

[22] Filed: Jul. 21, 1995

[51] Int. Cl.$^6$ ...................................................... H05K 7/14
[52] U.S. Cl. .......................... 361/799; 361/816; 361/818; 361/724; 361/727; 174/35 R
[58] Field of Search ............................. 361/212, 220, 361/724, 725, 726, 727, 690, 766, 797, 799, 802, 816, 818, 685; 174/35 R; 211/41

[56] References Cited

U.S. PATENT DOCUMENTS 4,544,066 10/1985 Koppensteiner et al. ................. 211/41
4,821,145  4/1989 Corfits et al. ............................ 361/383

OTHER PUBLICATIONS

Tinnerman Brand Fastners Catalogue p. 55 part number C50497–031, 1987.

*Primary Examiner*—Michael W. Phillips
*Assistant Examiner*—David Foster
*Attorney, Agent, or Firm*—Fish & Richardson P.C.

[57] ABSTRACT

A cabinet is provided for housing a plurality of electrical chassis. Each one of the chassis contains electronic devices and components, such as for example, a magnetic storage disk drive. The cabinet has a plurality of shelves adapted to receive one of the chassis. The shelves are provided by a cage-like structure. More particularly, each shelve has a pair of laterally spaced, electrically conductive wires upon which laterally spaced bottom portions of chassis rests when inserted into the cabinet. Wire struts are mechanically and electrically connected transverse to the laterally spaced shelve wires. A resilient, electrically conductive V-shaped clip is provided. The vertex of the V-shaped clip is shaped to attach to the wire strut with one side of the clip projecting into the bottom portion of the chassis receiving space provided by the shelve, and the other side of the clip projecting into the upper portion of a chassis receiving space provided by a lower shelve. When the upper and lower chassis are inserted into the spaces, the sides of the clip engage the upper and lower chassis and, by camming action, compress the sides of the clip inwardly while the resiliency of the clip urges the sides outwardly to maintain contact with the chassis. With such arrangement, the cage-like shelve structure enables effective cooling to the chassis and the clips ensure good ground contact between the chassis and the cabinet. Thus, the cabinet provides for both EMI shielding and assists in the elimination of electrostatic discharge (ESD).

5 Claims, 6 Drawing Sheets

ELETRICAL CHASSIS STORAGE CABINET

CROSS REFERENCE TO RELATED APPLICATIONS

This invention relates to U.S. patent application Ser. No. 08/368,316, filed Dec. 30, 1994, entitled "Peripheral Cage Apparatus and Method", inventors Philip LaRiviere, Thomas Georgens and Charles S. F. Loewy, assigned to the same assignee as the present invention, the contents of which are incorporated herein by reference.

BACKGROUND OF THE INVENTION

This invention relates generally to electrical chassis storage cabinets and more particularly to cabinets adapted to house, and enable adequate cooling to, the electrical chassis.

As is known in the art, cabinets are used to store chassis containing electrical components, motors, etc; such as those used for magnetic storage devices. Typically, such cabinets have an array of shelves for the chassis. The cabinet may also include fans to force air over the chassis and thereby dissipate heat generated in the chassis by the electrical components and motors. In order to shield the components from electromagnetic interference (EMI), the chassis are made of an electrically conductive material and are electrically grounded cabinet.

SUMMARY OF THE INVENTION

In accordance with the present invention, a cabinet is provided for housing a plurality of electrical chassis. Each one of the chassis contains electronic devices and components, such as for example, a magnetic storage disk drive. The cabinet has a plurality of shelves adapted to receive the chassis. The cabinet is a cage-like structure made up of bars, wires, etc., hereinafter collectively referred to as wires. More particularly, each shelve includes a pair of, preferably two pair of, laterally spaced, electrically conductive wires upon which the bottom portion of the chassis rests. Additional electrically conductive wires, or struts, are welded in a spaced relationship, transverse to the aforementioned shelve wires. Resilient, electrically conductive V-shaped clips are provided for the shelve wires. The vertex of each V-shaped clip is shaped to attach to the strut wire. The sides of the clip project above and below chassis receiving spaces provided by the shelve wires. When the chassis are inserted into the spaces, the sides of the clip engage the bottom surface of the upper chassis and the top surface of the lower chassis. When engaged by these surfaces, the sides of the clip compress inwardly by camming action while the resiliency of the clip continues to urge the surfaces outwardly so that the sides are maintained forced against the surfaces even after the chassis are fully inserted into their respective chassis receiving spaces. Likewise, when the chassis are removed from the shelves, their surfaces remain in contact with the sides of the clip until they are removed from the cabinet.

With such arrangement, the cage-like cabinet enables effective cooling to the chassis while the clips ensure electrical ground contact between the chassis and the cabinet. Thus, the cabinet provides for effective cooling and also provides for EMI shielding while assisting in the elimination of electrostatic discharge (ESD) as the chassis are inserted into, and removed from the shelves.

DESCRIPTION OF THE PREFERRED EMBODIMENTS

Figure 1:
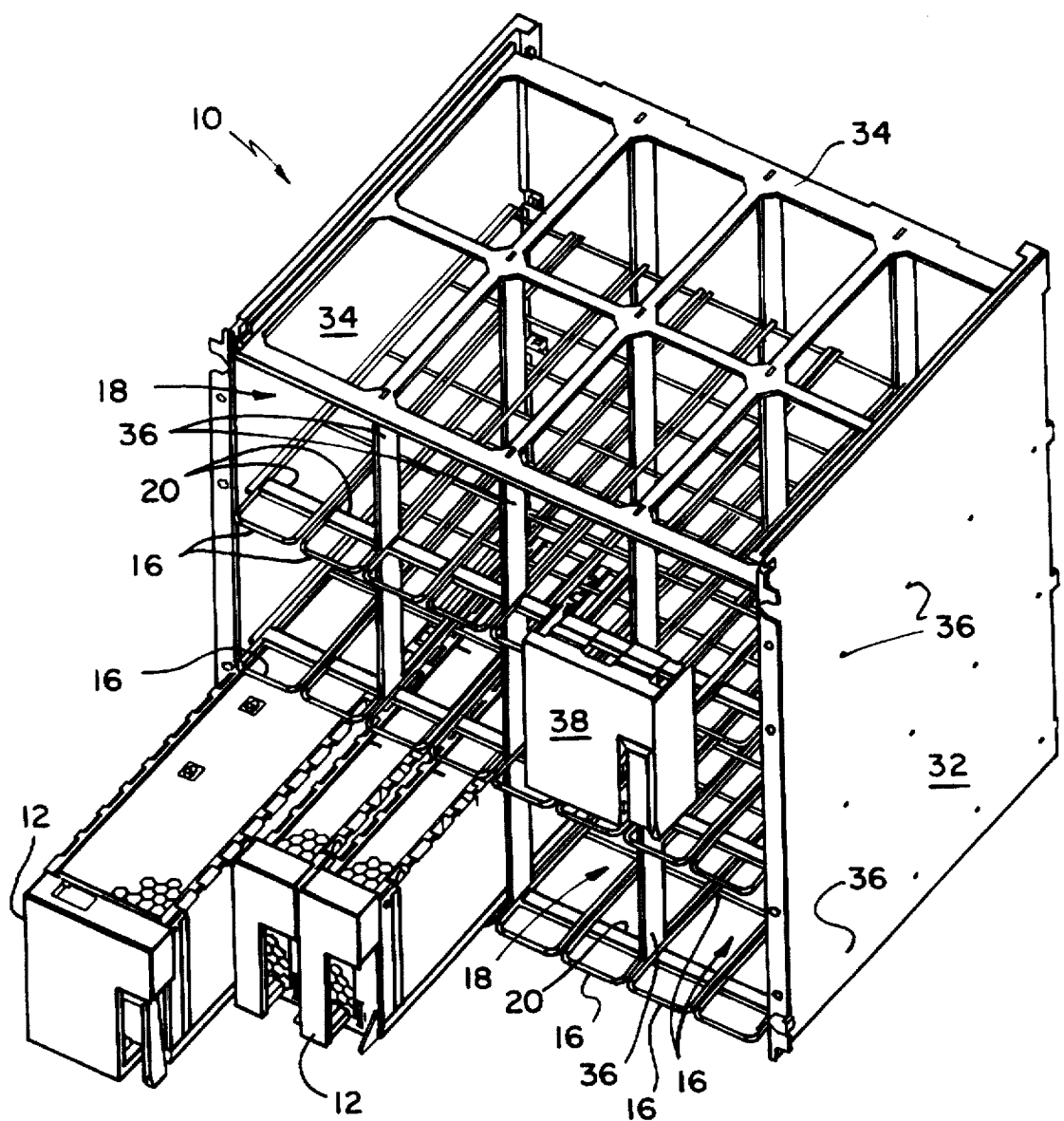
FIG. 1 is a perspective view of a cabinet adapted to house a plurality of electrical chassis according to the invention.
Figure 2:
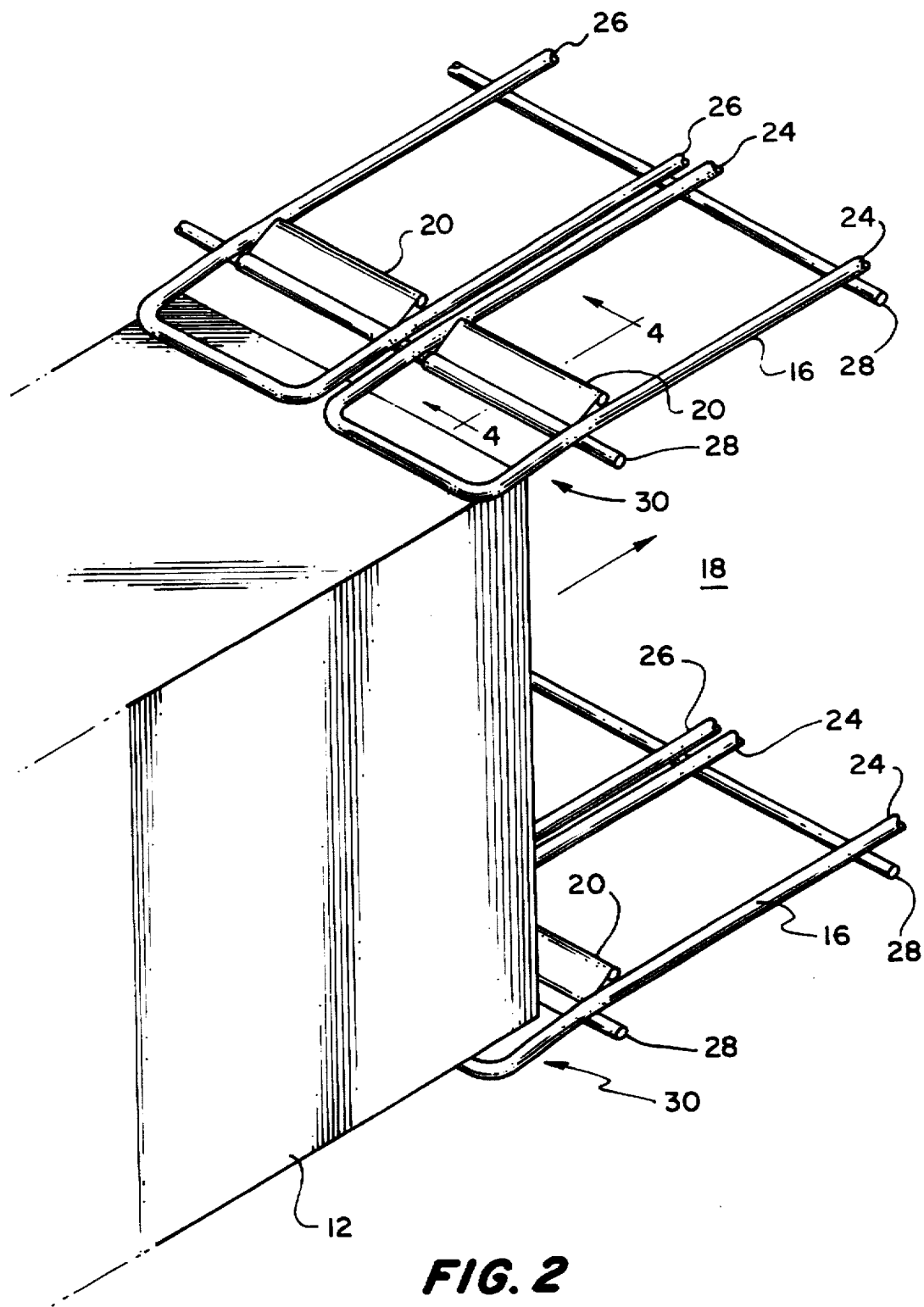
FIG. 2 is a perspective view of a portion of the cabinet of FIG. 1, such view showing a leading edge of an electrical chassis positioned to be received in a chassis receiving space formed between an exemplary pair of the shelves of the cabinet.
Figure 3:
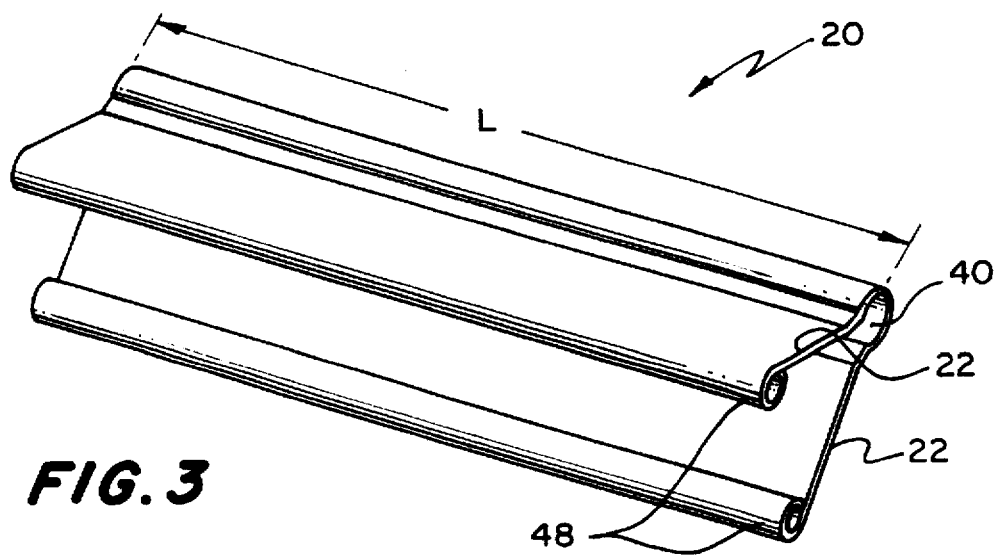
FIG. 3 is a perspective view of a clip removable from, and attachable to, a shelve shown in FIG. 2.
Figure 4:
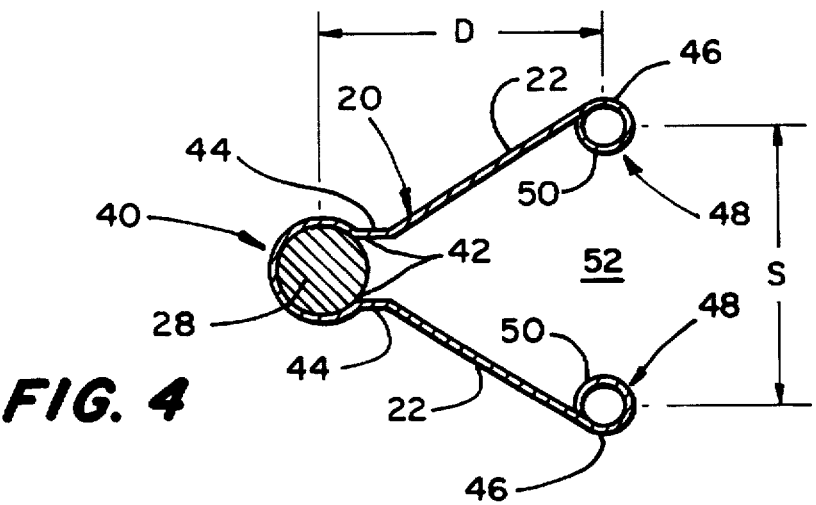
FIG. 4 is a cross-sectional elevation view of the clip of FIG. 3 attached to a portion of a shelve of FIG. 2, such cross-section being taken along line 4—4 in FIG. 2.
Figure 8:
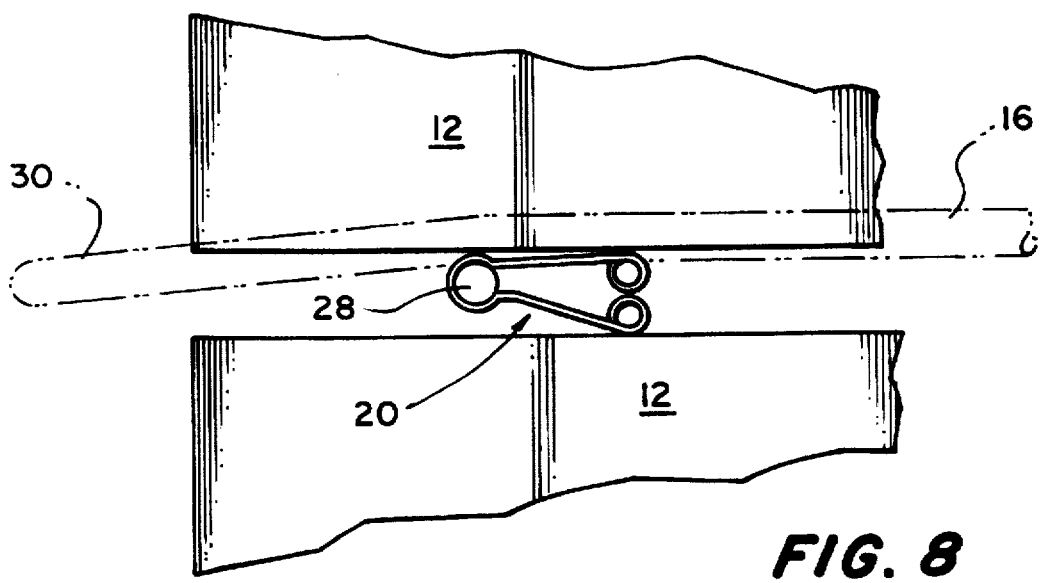
Figure 5:
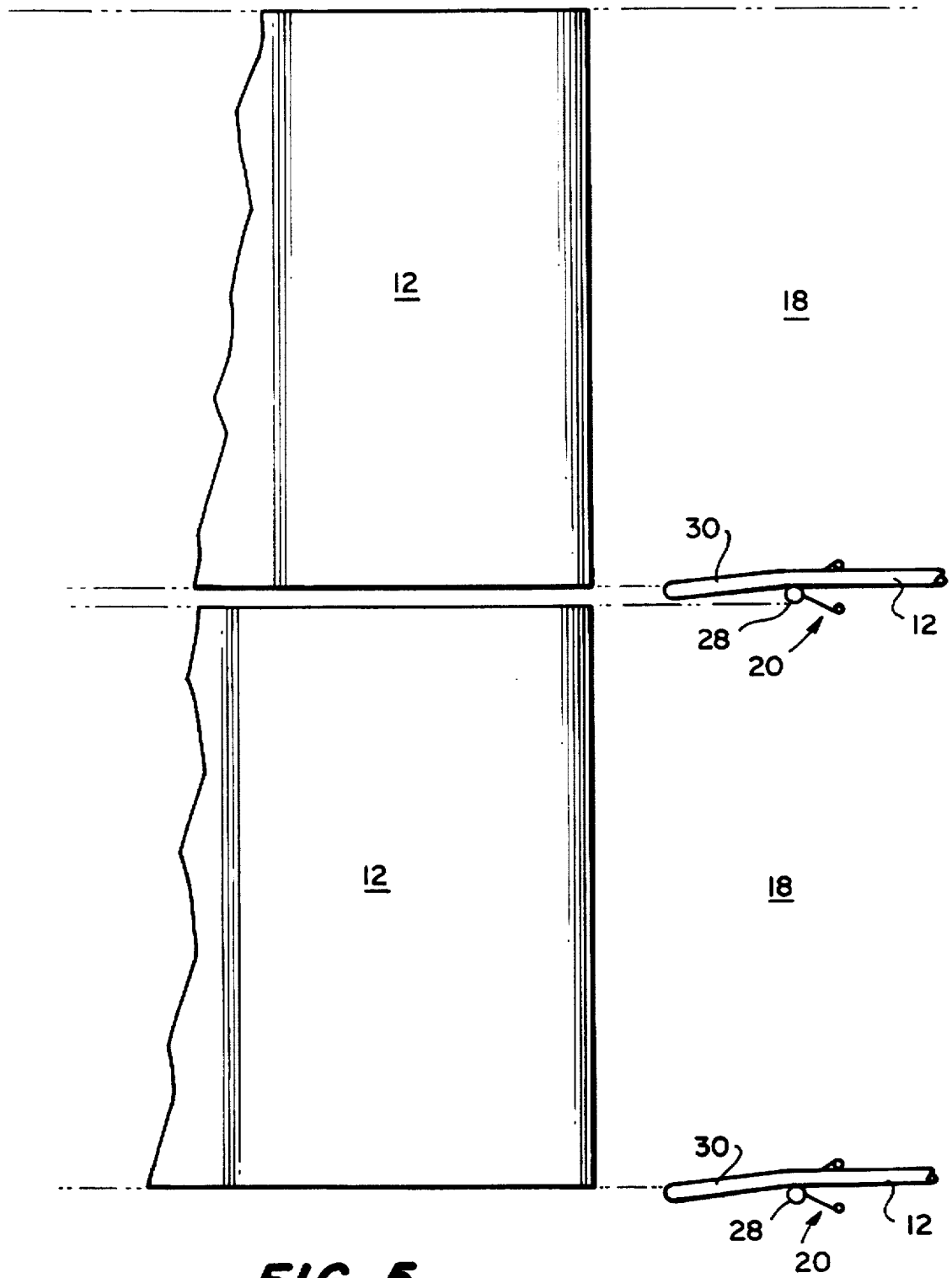
FIG. 5 is a side elevation view showing the clip of FIG. 3 in an expanded condition as when a pair of chassis are not resting on the shelves adapted to hold the clip.
Figure 6:
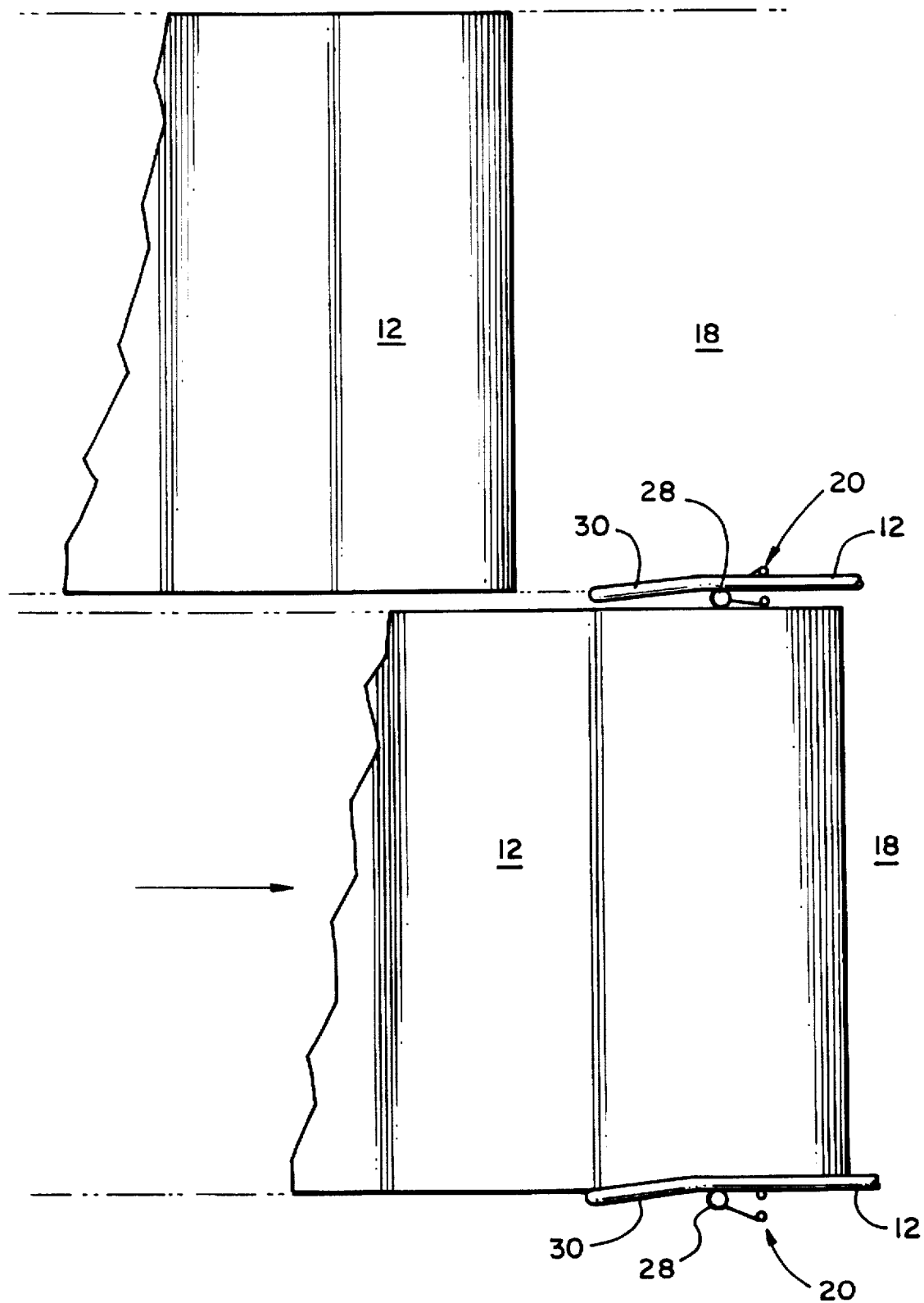
FIG. 6 is a side elevation view showing the clip of FIG. 5 when one of the pair of chassis is not resting on a shelve and the other one of the pair of chassis is resting on a shelve below the aforementioned shelve.
Figure 7:
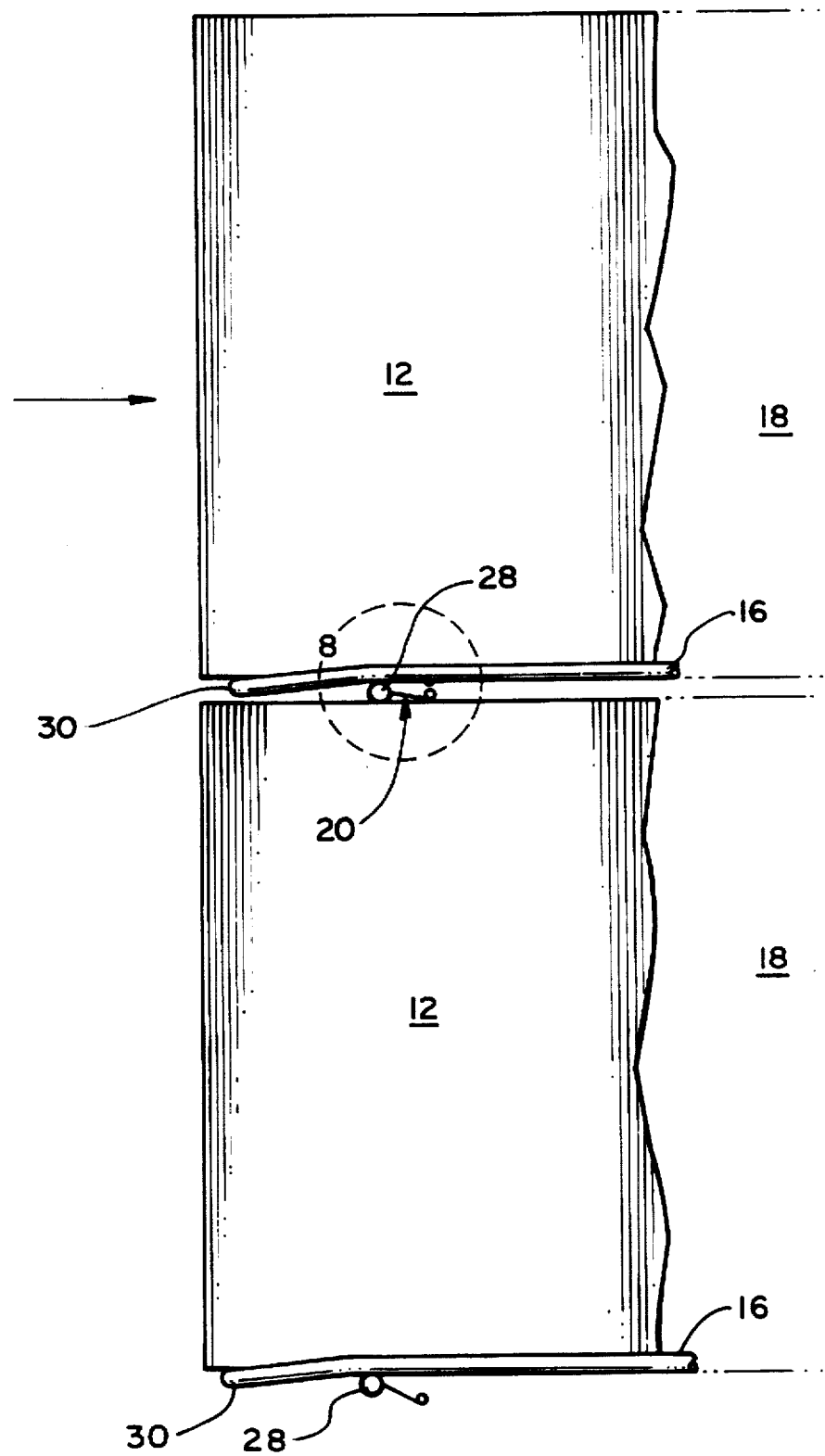
FIG. 7 is a side elevation view showing the clip of FIG. 3 in a compressed condition as when the pair of chassis are resting on the shelves holding the clips; and, FIG. 8 is a cross-sectional view of the region in FIG. 7 enclosed by a dotted circle labeled 8 in FIG. 7.

Referring now to FIG. 1, a cabinet 10 is shown for housing a plurality of electrical chassis 12, here disk drives. The cabinet 10 is a cage-like, electrically conductive structure arranged to provide an array of shelves 16, for holding electrical chassis 12, as shown. Here, the shelves 16 are arranged in an array of four rows and three columns, as shown, to provide a rectangular array of four rows and three columns of chassis receiving spaces 18, as indicated. A cage-like structure similar to cabinet 10 is described in the above referenced patent application Ser. No. 08/368,316, the contents of which is incorporated herein by reference. A plurality of electrically conductive clips 20, shown in detail in FIGS. 2, 3, and 4, are attachable to, removable from, the cabinet 10. Each one of the clips 20 has surfaces 22 (FIGS. 3 and 4) adapted to electrically contact upper and lower chassis 12 when such chassis 12 are placed on shelves 16, as shown in FIG. 8.

More particularly, each shelve 16 of the cage-like structure has, here, two pairs of laterally spaced, electrically conductive wires 24, 26 respectively, upon which the bottom of chassis 12 rest when inserted into the space 18 provided in the cabinet 10. Additional wires, (i.e., struts 28), are disposed in spaced relationship transversely to the two pairs of wires 24, 26, as shown in FIG. 2. The struts 28 are mechanically and electrically connected to, here by welding, the two pairs of wires 24, 26. Here, each one of the pair of laterally spaced wires 24, 26 is formed by bending a single wire in the shape of a U, as shown. As noted above, each shelve 16 has a pair of adjacent, U-shaped wires 24, 26, as shown, and the wire struts 28 span the U-shaped shelve wires 24, 26, as shown. The shelve wires 24, 26 used for the shelves 16 are here rounded steel having a diameter of 0.135 inches. The forward facing, base portion 30 of the U-shaped shelve wires 24, 26 is bent downward, as shown, to facilitate in sliding the chassis 12 onto the shelve 16 formed by the shelve wires 24, 26. The wire strut 28 is also here rounded steel having a diameter of 0.135 inches. The U-shaped shelve wires 24, 26 are affixed to, here welded to, the transverse, wire struts 28, as noted above. The ends of the wire struts 28 are affixed to vertical side panels 32, 34 of the cabinet 10, here by welding at points 36. The vertical side panels 32 are connected to a sheet metal frame 34 having rectangular shaped openings, as shown. Thus, the cage-shaped cabinet 10 is more than 80 to 90% open to permit air flow for cooling. Here, the cabinet 10 has three shelves 16. Each shelve 16 can here hold either one 5¼ inch disk drive or two 3½ inch disk drives in the space 18 between each vertical support 36. Thus, each shelve has two clips 20 adapted to clip onto the strut wires spanning the shelve. A filler panel, such as filler panel, 38 here positioned in be placed in the upper right hand corner space 18, is used in spaces 18 which do not occupy a chassis 12. Additional support to the U-shaped shelve wires 24, 26 providing shelves 16 by hooking such shelve wires 24, 26 to vertical supports 36, by hooks, not shown, formed on the vertical supports 36.

The clip 20 (FIGS. 3 and 4) is a resilient, flexible, electrically conductive V-shaped clip 20, here having a length, L, of 1.7 inches. Clip 20 is here heat treated beryllium-copper having a thickness of 0.004 inches. The vertex 40 of the V-shaped clip 20 is rounded to attach to the wire strut 28. As noted above, each shelve 16 has a pair of clips 20. When formed, and in its free standing condition, the diameter of the rounded vertex 40 is here 0.14 inches. It is noted that the rounded vertex 40 of the clip 20 extends along an arc greater than 180 degrees, here ? degrees, to provide a C-shaped edge. The ends 42 of the C-shaped edge terminate into a pair of generally parallel, planar sections 44, as shown. When formed, and in its free standing condition, the distance spanning the planar sections 44 is less than the diameter of the strut 28. Here, the distance between the planar sections when the clip is formed, and in its free standing condition, is 0.05–0.1 inches. Thus, when urged over the transverse wire strut 28, the rounded vertex 40 spreads more open, i.e., slightly outwardly, as the inner surfaces thereof side over the outer surface of the wire strut 28. Because of the resilience of the clip 20, once the inner surface of the rounded vertex 40 slips over the outer surface of the wire strut 28, the clip 20 compresses slightly to grasp onto the wire strut 28 to thereby hold itself onto the wire strut 28, as shown. The planar sections 44 terminate into opposing, proximal sides 22 of the V-shaped clip 20. The distal ends 44 of the sides 22 terminate into rounded, here circular, cylindrical shaped ends 48. Here, the inside diameter of each circular, cylindrical shaped end 48 is 0.062–0.072 inches. When formed, and in its free standing condition, the center to center spacing, S, between the circular, cylindrical ends 48 is here 0.4–0.5 inches. The distance, D, between the center of the circular shaped vertex to a line between the centers of the circular, cylindrical ends, is here 0.4–0.8 inches. Side portions 50 of the cylindrical shaped ends 48 are disposed in inner regions 52 between the sides 22 of the V-shaped clip 20, with one side 22 of the clip projecting into the bottom portion of the chassis receiving space 18 provided by the shelve 12, and the other side 22 of the clip 20 projecting into the upper portion of a space 18 provided by a lower shelve 12 to receive a lower chassis, as shown in FIG. 8. The clip 20 is arranged on the wire strut 28 and is of a construction to enable the sides 22 of the clip 20 to engage upper and lower surfaces of upper and lower chassis 12 when such upper and lower chassis 12 are inserted into the spaces 18 (FIGS., 6 and 7) and, by camming action urge the sides 22 of the clip 20 to compress inwardly into space 52 (FIG. 4) between sides 22 while the resiliency of the clip enables the sides 22 to urge outwardly and thereby maintain contact with the upper and bottom surfaces of the bottom and upper chassis 12, respectively, as shown in FIG. 8.

Other embodiments are within the spirit and scope of the appended claims.

What is claimed is:

1. A cabinet for housing a plurality of electrical chassis, comprising:

a cage-like, electrically conductive structure arranged to provide an array of chassis holding shelves, an electrically conductive clip attached, and electrically connected to, one of the shelves, such clip having a surface adapted to electrically contact a chassis when such chassis is on such shelve.

2. The cabinet recited in claim 1 wherein the structure is arranged to provide an array of shelves, each shelve having:

a pair of laterally spaced, electrically conductive wires upon which laterally spaced bottom portions of chassis rest when such chassis is inserted into the cabinet; and, a wire strut disposed transverse to the pair of wires, such additional wire being mechanically, and electrically connected, to the pair of wires.

3. The cabinet recited in claim 2 wherein the clip is a resilient, electrically conductive V-shaped clip.

4. The cabinet recited in claim 3 wherein the vertex of the V-shaped clip is shaped to attach to the wire strut with one side of the clip projecting into the bottom portion a chassis receiving space provided by the shelve, and the other side of the clip projecting into the upper portion of a chassis receiving space provided by a lower shelve to receive a lower chassis.

5. The cabinet recited in claim 4 wherein the clip is arranged on the wire strut and of a construction to enable the sides of the clip to engage upper and lower surfaces of upper and lower chassis when such upper and lower chassis are inserted into the chassis receiving spaces provided by the shelves and, by camming action urge the sides of the clip to compress inwardly while the resiliency of the clip urges the sides to maintain contact with the upper and lower chassis.

* * * * *